United States Patent [19]

Liebert

[11] 4,271,678
[45] Jun. 9, 1981

[54] LIQUID REFRIGERATION SYSTEM FOR AN ENCLOSURE TEMPERATURE CONTROLLED OUTDOOR COOLING OR PRE-CONDITIONING

[75] Inventor: Ralph C. Liebert, Worthington, Ohio

[73] Assignee: Liebert Corporation, Columbus, Ohio

[21] Appl. No.: 26,600

[22] Filed: Apr. 3, 1979

Related U.S. Application Data

[63] Continuation-in-part of Ser. No. 779,743, Mar. 21, 1977, abandoned.

[51] Int. Cl.³ .................. F25B 29/00; F25D 17/02
[52] U.S. Cl. ........................................ 62/173; 62/201
[58] Field of Search ............ 126/428, 419; 236/91 F; 62/173, 201, 209, 332

[56] References Cited

U.S. PATENT DOCUMENTS

| 2,242,334 | 5/1941 | Wile |  |
|---|---|---|---|
| 3,525,385 | 8/1970 | Liebert | 165/50 X |
| 4,023,947 | 5/1977 | Ferry | 62/332 |

Primary Examiner—William E. Wayner
Attorney, Agent, or Firm—Gerald L. Smith; Jerry K. Mueller, Jr.

[57] ABSTRACT

An economical energy-saving air-conditioning system for cooling air in an enclosure requiring year-around cooling. An outdoor heat exchanger is operative in a recirculating liquid closed-loop cooling system. A temperature controlled actuator provides continuous free cooling when the outside temperature is approximately 35° to 40° F. or less; and provides free pre-cooling of the air when the outside temperature is in the 35° to 65° F. range. The closed-loop comprises conventional components for summer temperature cooling; and, in less-than summer temperatures the present invention utilizes the outside heat exchanger to provide cool heat exchange liquid to a (free) cooling coil positioned to confront the air stream in advance of a refrigerant coil. Reheat for dehumidification is provided in an embodiment wherein thermal energy is taken from the waste heat of the refrigerant system.

11 Claims, 7 Drawing Figures

FIG. 5

| OUTDOOR TEMPERATURE | | POWER COMSUMPTION | | | | | |
|---|---|---|---|---|---|---|---|
| | | MECHANICAL REFRIGERATION | | PRIOR FREE COOLING | | PRESENT INVENTION | |
| RANGE (°F) | HOURS IN RANGE | USAGE RATE-Kw | TOTAL KWH | USAGE RATE-Kw | TOTAL KWH | USAGE RATE-Kw | TOTAL KWH |
| -10 to 34 | 2598 | 18.4 | 47,800 | 7.09 | 18,420 | 7.09 | 18,420 |
| 35 to 39 | 737 | 18.4 | 13,560 | 19.9 | 14,670 | 8.92 | 6,570 |
| 40 to 44 | 599 | 18.4 | 11,020 | 19.9 | 11,920 | 10.8 | 6,470 |
| 45 to 49 | 579 | 18.4 | 10,650 | 19.9 | 11,520 | 12.6 | 7,300 |
| 50 to 54 | 603 | 18.4 | 11,100 | 19.9 | 12,000 | 14.4 | 8,680 |
| 55 to 59 | 627 | 18.4 | 11,540 | 19.9 | 12,480 | 16.2 | 10,160 |
| 60 to 64 | 690 | 18.4 | 12,700 | 19.9 | 13,730 | 18.1 | 12,490 |
| 65 to 69 | 791 | 18.4 | 14,550 | 19.9 | 15,740 | 19.9 | 15,740 |
| 70 to 74 | 669 | 18.4 | 12,310 | 19.9 | 13,310 | 19.9 | 13,310 |
| 75 to 79 | 456 | 19.2 | 8,760 | 20.7 | 9,440 | 20.7 | 9,440 |
| 80 to 84 | 261 | 20.2 | 5,270 | 21.5 | 5,610 | 21.5 | 5,610 |
| 85 to 89 | 115 | 20.8 | 2,390 | 22.4 | 2,580 | 22.4 | 2,580 |
| 90 to 94 | 32 | 21.7 | 690 | 23.2 | 740 | 23.2 | 740 |
| 95 to 99 | 3 | 22.6 | 68 | 24.2 | 73 | 24.2 | 73 |
| TOTALS | 8760 | | 162,408 | | 142,233 | | 117,583 |

FIG. 6

LIQUID REFRIGERATION SYSTEM FOR AN ENCLOSURE TEMPERATURE CONTROLLED OUTDOOR COOLING OR PRE-CONDITIONING

DESCRIPTION

Related Applications

The present application is a continuation-in-part of copending application Ser. No. 779,743, filed Mar. 21, 1977 (now abandoned).

BACKGROUND OF THE INVENTION

As industry has turned to an extensive utilization of complex processing and control equipment, a concomitant need has arisen for specialized treatment of the environment within which this equipment operates. Exemplary of such equipment are computer installations which exhibit relatively high heat emission rates representing a generally continuous (year around) load to air conditioning equipment, the operational demands upon which have heretofore been typically seasonal in nature. In addition to requiring accurate removal of generated heat loads, such installations further require control over the relative humidity within their zonal environment.

Theretofore, the air conditioning industry has responded to requirements for providing accurate temperature and humidity control within the enclosed regions of computer rooms and the like, on the one hand, with the somewhat brute force approach of operating typical refrigeration components to continuously treat air within the zone surrounding the equipment. As might be expected, the energy demands associated with such an approach do represent a significant cost factor. In another approach, advantage has been taken of seasonally lower outdoor (ambient) temperatures by a controlled mixing of cooler outdoor air with recirculated air. This commingling of air permits an intermittant deactivation of energy consuming refrigeration components.

Humidity control generally is carried out through the use of humidifiers to add moisture generally at the output region of air conditioning apparatus, while dehumidification, on the other hand, is a more elaborate process. Typically, dehumidification requires the operation of refrigeration components to remove moisture and this operation usually is associated with a reheating of the thus dehumidified but cooled air to regain the required zone target or "set point" temperature. One disadvantage attendant with the use of outside air to contribute to cooling stems from the general tendency of industry to locate computer rooms and the like well within the internal regions of buildings. As a consequence, access to outside air can be achieved only through the use of extensive and bulksome ducting, a requirement rendering the otherwise achieved energy conservation impractical and economically unsound. However, should the location disadvantage be overcome, typically encountered variations in ambient air humidity have been found to counteract the energy gains from utilizing outdoor air at lower temperature, inasmuch as a greater consumption of energy is required to carry out humidification and dehumidfication than initially conserved in using the outside air. This outside air also will contain undesirable contaminants such as dust and the like.

The first practical system introduced to industry wherein effective energy conservation was achieved taking advantage of lower outside or ambient air temperatures is described in U.S. Pat. No. 3,525,385. This system provides an outdoor heat exchanger which operates in conjunction with a liquid heat exchanging medium, such as glycol or the like, which is pumped through conduits into the building retaining the enclosed air conditioned region and at which point this fluid is utilized both to provide heat exchange within the condenser units of a refrigeration system and, alternately, to provide cooling through the use of a liquid cooling coil interposed within the air flow of the internally disposed air conditioning equipment. Thus, as outdoor temperatures drop below predetermined levels, i.e. about 35° F., full advantage is taken of those lower levels to accommodate the heat loads imposed from computer equipment and the like. Alternately, in warmer seasons, the higher outdoor temperatures can be utilized to provide a reheat function utilizing the heat exchange liquid in conjunction with now operating refrigeration components. As industry has seen fit to adapt this energy conserving system, the term "free-cooling" has been found to be used to describe such an energy saving feature.

While the economies recognized with previous free cooling systems are important, their use is somewhat constrained in consequence of the number of days in a year wherein the temperature is adequately low, i.e. below 35° F. Average temperature data are available for most American cities. An examination of these data reveals that in geographical areas currently comprising about 75% of industry and commerce, outdoor temperatures between 35° F. and 65° F. occur for at least of one-half of a given year, while temperatures of 35° F. and below occur for less than 100 days of that year. Should a free cooling system be available taking advantage of the outdoor environment at temperatures above 35° F., enhanced economies due to lower energy consumption will be realized through a more restrictive operation of mechanical refrigeration system components. In the latter regard, compressor operation alone is considered to account for about 70% of the total energy consumption of a mechanical refrigeration system.

Reference is made to U.S. Pat. Nos. 3,522,451; 3,714,980 and 3,844,475 which describe an arrangement wherein a temperature control actuator turns on and turns off multiple units in an environmental conditioning system as determined by need.

SUMMARY

The present invention is addressed to the provision of an economical, energy-saving air-conditioning system suited for year-around space cooling. This improved system is capable of capitalizing on the cool outdoor air temperatures within intermediate temperature ranges where the outdoor temperature is still below the temperature of the controlled enclosure, yet above the temperature at which the above-discussed prior art systems have performed. The improved system serves to precondition recirculated air within the zone of air conditioning and thus offers a partial cooling of that air which subsequently is treated by the energy consuming mechanical refrigeration components of the system. Because a surprisingly large number of operating hours occur in a considerable number of industrial regions within the temperature range at which this pretreatment occurs, compelling economies in energy consumption are recognized by the new system.

Another feature and object of the invention is to provide an improvement in an air conditioning system of a variety which treats air within a zone to achieve a predetermined temperature or set point temperature therewithin, such system having refrigeration components including compressors, condensers, evaporator coil and input and output conduits for circulating a heat exchange fluid from an outdoor situated heat exchanger to the condensers. The improved system provides a liquid cooling coil which is situated to confront and cool return air from the zone prior to the passage of that air through the evaporator coil. A cooling valve is provided which is coupled with a noted conduit which is actuable to effect a select passage of the heat exchange fluid through the cooling coil, while a control arrangement serves to respond to the temperature of return air within the zone as well as the temperature of the heat exchange fluid moving from the heat exchanger to controllably actuate the cooling valve. The system further functions in a manner wherein the cooling valve is actuated to an extent wherein the capability of the liquid cooling coil for cooling confronted air is utilized when the return air temperature is above that of the heat exchange fluid, the compressors of the system and associated components being operated to cool return air only when the liquid cooling coil capability is inadequate to cause return air to attain the predetermined or set point temperature.

Another object of the invention is to provide an improved air conditioning system of the type described wherein the aforesaid cooling coil is utilized in conjunction with the heat exchange fluid to provide at least a contribution to cooling where dehumidification of return air is required. Further, the system may include a heating coil situated to confront and heat air directed thereto from the refrigeration system evaporator coil. A heating valve is provided in conjunction with the aforesaid conduits and heating coil and is controlled to provide a correspondingly controlled heating of air having passed the evaporator coil under conditions wherein the return air temperature is lower than the set point or predetermined temperature. Additionally, the control arrangement of the system may activate an auxiliary heating arrangement when the heating capacity of heating coil and associated heat exchange fluid is inadequate to alter the return air temperature to substantial equality with the set point or predetermined return air temperature.

Other objects of the invention will, in part, be obvious, and will, in part, appear hereinafter.

The invention, accordingly, comprises the system and apparatus possessing the construction, combination of elements and arrangement of parts which are exemplified in the following detailed disclosure. For a fuller understanding of the nature and objects of the invention, reference should be had to the following detailed description taken in connection with the accompanying drawings.

DETAILED DESCRIPTION OF THE DRAWINGS

Figure 1:
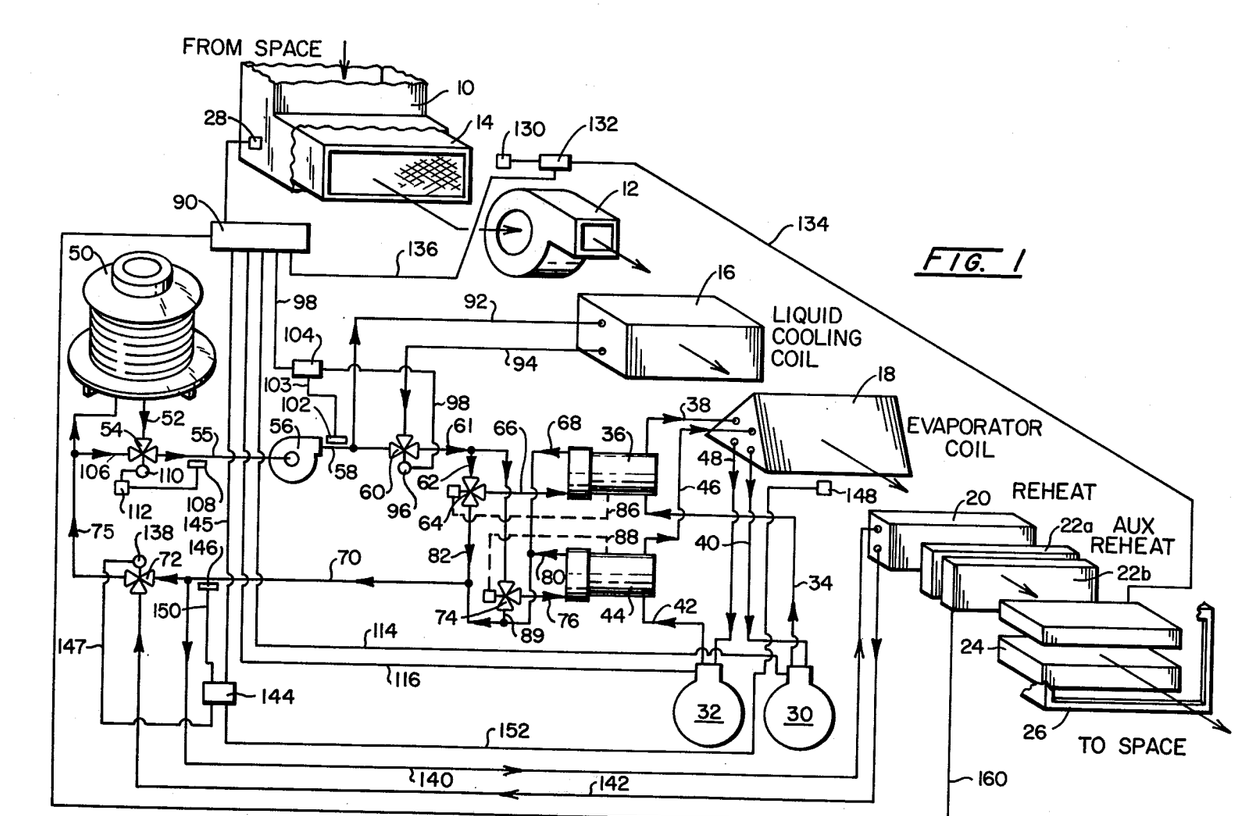
FIG. 1 is a schematic representation of an air conditioning system according to the invention which provides for year-around space conditioning.

Referring to FIG. 1, a schematic representation of the improved air conditioning system of the invention is portrayed. As the description of this figure unfolds, it will become apparent that four simultaneous flow patterns are represented in the drawing, an air flow pattern from the space or zone containing a heat load to the input of the air conditioning system as return air; a circulating loop of heat exchange fluid; the circulation of refrigerant and the associated electronic components of a control circuit. In its general treatment, air is returned from load space, for example, via a duct or input 10 in consequence of the operation of supply fan 12. The resultant air flow passes through a filter 14 and thence encounters and passes through a liquid cooling coil 16, i.e. a "free cooling coil", at which position it will be seen to be cooled to an extent made available in consequence of the temperatures of the ambient environment remote from the enclosed zone or region within which the system serves to treat air. This coil may be present as a plate fin coil.

From liquid cooling coil 16, the air passes through an evaporator coil 18 at which position it may be cooled by the refrigeration components of the system. Positioned downstream in the sense of air flow from evaporator coil 18 is a heating function shown present as a coil 20 which serves to selectively add thermal energy to the air having passed through evaporator coil 18. Such heating functions generally are utilized in connection with the operation of evaporator coil 18 and/or liquid cooling coil 16 for dehumidification purposes. Auxiliary reheat coils 22a and 22b are positioned downstream from heating function 20 and may be present as electrical resistance units or may contribute additional heat energy from any of a variety of sources available from the vicinity within which the system is operated. The system also includes a humidification stage which is represented generally at 24 and positioned, for illustrative purposes, adjacent an output duct 26. With the arrangement shown, air having been treated by the system leaves duct 26 to encounter the heat load within the zone being temperature and humidity controlled. Upon undergoing heat exchange with this load, the resultant, return air is drawn through return air or input duct 10 by the fan function 12 in continuous loop fashion. As the return air is drawn into duct 10, its temperature is sensed at a temperature sensor 28 which may be present as a thermister or the like and which derives a signal representing a feedback from the treated zone which is utilized by the control function of the system.

The refrigeration components of the system are somewhat conventional in nature, compressor stages being operated in conjunction with condensers to develop cooling at the evaporator coil 18. Two such compressor stages are represented in the drawing at 30 and 32, the hot refrigerant gas output of compressor stage 30 being shown schematically as directed along line 34 to be cooled at condenser 36. From condenser 36, the now liquefied refrigerant is directed, as represented schematically by line 38, to evaporator coil 18, at which point expansion is carried out to develop refrigeration cooling. The output or suction line of the refrigeration circuit is represented at line 40 being redirected to compressor stage 30. In similar fashion, compressor stage 32, when activated, provides a hot refrigerant gas output at line 42 which is directed to a condenser 44 to exit therefrom generally in liquefied form along line 46 for introduction into an additional distribution circuit within evaporator coil 18. As before, the suction line output for the latter component is provided along line 48 for assertion at compressor stage 32. Preferably, evaporator coil 18 is provided having a generally A-frame configuration comprising two direct expansion cooling circuits. Such an arrangement provides maximum coil area to permit more precise control over temperature and humidity. With the enlarged face area achieved by such structures, the low velocity air passing through two separate circuits within the coil provides highly effective exposure with less turbulence and greater sensitivity. The coils are particularly suited for the high sensible heat ratio required for performance within computer rooms and the like. Alternating portions of the coils forming the A-frame structure may be so circuited that the entire face area of the structure is served from either of compressor stages 30 or 32.

Condensers 36 and 44 operate in conjunction with a heat exchange fluid such as a conventional anti-freeze or glycol which extends through input and output conduits to a heat exchanger 50 which is located remotely from the zone or region of air being treated. The terms "input" and "output" are used herein in the sense that the input is to heat exchanger 50 and the output is therefrom. Heat exchanger 50 is positioned to be affected by the seasonally fluctuating temperature conditions of ambient, outdoor air. Consequently, this unit typically is referred to as an "outdoor heat exchanger". When operating in heat exchange relationship with condensers 36 and 44, cooled heat exchange fluid (glycol or the like) is drawn through heat exchanger output or discharge conduit 52 and liquid temperature control or mixing valve 54 as well as line 55 by a circulating pump 56, the fluid thence being driven along output conduit 58, through cooling valve 60 thence along conduits 61 and 62 through a diverting valve 64 and conduit 66 into condenser 36. Upon carrying out its heat exchange function within condenser 36, the heat exchange fluid exits therefrom along conduit 68 whereupon it is passed along input conduit 70 to confront and selectively pass a heating valve 72, whereupon it is directed through input conduit 75 to outdoor heat exchanger 50. In similar fashion, heat exchange fluid passes from conduit 61 into one input of a diverting valve 74 through conduit 76 to be passed in heat exchange relationship within condenser 44 and exit therefrom, following heat exchange, along output conduit 80. Conduit 80 is coupled with conduit 68 leading, as described above, to the outdoor heat exchanger 50.

The amount of heat exchange fluid which is passed by the system through condensers 36 and 44 is only that which is required to maintain proper refrigeration condensing temperatures. Thus, not all of the available fluid is utilized during typical operation. Accordingly diverting valve 64 is connected through conduit 82 to input conduit 70. This valve is a head pressure actuated type, as represented schematically by the pressure input line 86. In similar fashion, valve 74 is head pressure actuated, as represented at dashed line 88, so as to divert flow from conduit 76 through input conduits 89, 82 and 70 in correspondence with condensing needs. This particular arrangement, wherein, for a significant number of operational days the entire heat exchange capability of the system comprising the heat exchange fluid and heat exchanger 50 is not demanded by condensers 36 and 44, permits a performance wherein that fluid may be used for the second purpose of gaining cooling effects from ambient surroundings.

Now turning to that conservation feature of the system, temperature sensor 28 has been described as looking to the heat load effect upon the system by measuring the temperature of return air. This sensed temperature is compared within the system with a "set point" or predetermined temperature level desired for the zone air being treated. Typically, such a set point will be selected as 75° F. The control system of the invention, through an arrangement represented by function block 90 and described in more detail later herein, compares the sensed temperature with this set point temperature and serves in response thereto to selectively circuit cooled heat exchange fluid from conduit 58 through liquid cooling coil supply conduit 92 to liquid cooling coil 16, the fluid being returned along conduit 94 to cooling valve 60 following heat exchange with return air within the system. The extent of this circuiting of heat exchange fluid through conduit 92 is proportioned in correspondence with the extent of the differential between the set point temperature and temperature sensed at sensor 28. Accordingly, cooling valve 60 is actuated by a voltage level responsive motor 96 which is energized to selective orientations between fully open (circuiting fluid to coil 16) and closed positions (isolating coil 16) in correspondence with a signal asserted from function block 90 through line 98. Such proportioning valves as at 60 and associated motors 96 are available in the market place, one such motor being marketed under the trade designation "Honeywell Modutrol Motor" Model M734D by Honeywell Inc., Minneapolis, Minn., 55422, and valve 60 being designated as model V5013A from that source.

As a condition precedent to a signal being asserted through line 98 progressively opening the valve 60 to conduit 94, the temperature of heat exchange fluid within conduit 58 at least must be lower than the temperature of return air as detected at sensor 28. Of course, other comparisons can be made for this purpose, for example, the condition may be established that the temperature of the fluid in line 58 be lower than the "set point" temperature. Thus, an enabling switch arrangement is provided within the system including a sensor 102, measuring the temperature of liquid within conduit 58, which is functionally coupled by line 103 to a snap action-like switch 104, the combination being referred to generally as an "aquastat". Such aquastats are available to industry, for example, being marketed under the trade designation "Honeywell Aquastat" Model T6031A-1052, by Honeywell Corp., (supra).

Inasmuch as the fluid within conduit 58 will attain temperatures within a broad range thereof, including those which may be considered quite cool, liquid temperature control valve 54 is connected having an available mixing input of higher temperature heat exchange fluid from conduits 75 and 106 which it may draw upon and mix with cooler fluid entering the valve from conduit 52. By limiting the lowest temperature which the fluid may exhibit within conduit 55 through this mixing activity, frost or moisture development upon the output conduit extending into the building containing the zone or region or air treatment is avoided. Note that the valve includes a thermostat sensor 108, valve control motor 110 and the control thermostat 112 and may respectively be provided as Models T991A, M934A and V-5013A all by Honeywell Corp. (supra).

The system as thus far described may exhibit a maximum air conditioning capability with the full utilization of the heat exchange fluid as cooled at outdoor heat exchanger 50 and circulating through conduits 92 and 94 to coil 16, and additionally with the activation of both compressor stages 30 and 32 of the refrigeration system. Control over the activation and deactivation of these latter stages is provided from control system 90, as indicated schematically by respective lines 114 and 116, extending therebetween.

In operation, during warmer or summer seasons, where outdoor temperatures are above the temperature of return air sensed at sensor 28 or above the set point temperature, the resultant temperature of heat exchange fluid within input conduit 58, as sensed at sensor 102, will be such as to inhibit the actuation of valve 60 by motor 96. Under such conditions, the system carries out normal air conditioning cooling, one or both of compressor stages 30 and 32 being energized for operation in conjunction with evaporator coil 18.

When the outdoor temperatures are lower, however, the temperature of heat exchange fluid within conduit 58 correspondingly lowers, for example to a point below the dry bulb temperature of return air as witnessed at sensor 28. Then the control asserted from function 90 through line 98 is not inhibited at switching function 104, and motor 96 may be energized to permit the circuiting of heat exchange fluid through conduits 92 and 94. This activity serves to pre-cool return air passing through liquid cooling coil 16 to the extent made available by the lower temperature of the heat exchange fluid. Note, that valve 60 alters from a "closed" condition to an orientation wherein flow is permitted from conduit 94 to conduit 61. The opening of valve 60 by motor 96 is one proportioned with the difference between the dry bulb temperature sensed at sensor 28 and, for example, the set point of the system. Thus, a control over the amount of cooling effected at coil 16 is provided where the temperature of the heat exchange fluid becomes very low. Assuming that the temperature of that fluid is not adequate to cool return air to the set point, a full diversion of fluid through conduits 92 and 94 will be carried out and, a first of the compressor stages, i.e. that at 30, will be activated by signal along line 114 from control function 90. Where the resultant cooling is not sufficient to achieve the set point temperature, control function 90 then activates the second compression stage 32 by signal imposed through line 116. As the return air temperature commences to diminish toward the set point temperature, the system control is reversed, the high energy consuming compressor stages 32 and 30 being deactivated before any alteration of valve 60 takes place. Looking additionally to FIG. 3, this cooling operation of the system may be explored in more detail. In the figure, the set point temperature of the system is shown by a vertical line positioned at the center of a chart, the abscissa extending to the right of which describes conditions wherein the zone temperature, as witnessed at sensor 28, increases from the set point temperature. In effect, the abscissa shows temperature difference values between the set point temperature and that temperature witnessed at sensor 28, an operational temperature differential dry bulb of about 3° F. usually is provided for in the control scheme. A ramp-shaped line 120 is provided in the figure to very generally depict the type of voltage signal generated to develop cooling logic control over the components of the system. When zone temperatures are at least within a fraction of a degree of the set point temperature as represented at, a, cooling valve 60 is in a closed (by pass) orientation wherein no fluid flow is permitted through conduits 92 and 94 to liquid cooling coil 16. However, as the air within the treated zone increases in temperature, function 90 developes a correspondingly progressively increasing voltage value which is utilized in controlling motor 96 of valve 60. Thus, cooling valve 60 assumes progressively more open positions permitting the correspondingly greater flow of heat exchange fluid through conduits 92 and 94 until such time as temperature difference position, b, is reached, representing a full circuiting or diversion of heat exchange fluid from conduit 58 into conduit 92. As the zone return air temperature further increases to the level represented as a temperature difference, d, the first compressor stage 30 is activated to commence conventional refrigeration operation at evaporator coil 18. Should this cooling combination from liquid cooling coil 16 and evaporator coil 18, operating in conjunction with compressor stage 30, still not be sufficient, the zone temperature will increase further to establish a temperature difference represented at position, f, whereupon the second compressor stage 32 is activated such that the system is performing at maximum cooling capacity. As this high cooling activity commences, the zone return air temperature will commence to lower, and control system 90 will function to turn off the second compressor stage 32 first, as represented at position, e. With the additional cooling down of the zone toward the set point temperature, system 90 then deactivates the first compressor stage 30 as the temperature differential reaches the position, c. As the zone then more closely approaches the set point temperature, valve control function 90 will commence to progressively activate motor 96 to, correspondingly, progressively lessen the amount of heat exchange fluid permitted to flow into conduit 92 and thence to liquid cooling coil 16. This activity ensues until valve 60 terminates the flow of heat exchange fluid to liquid cooling coil 16.

Figure 3:
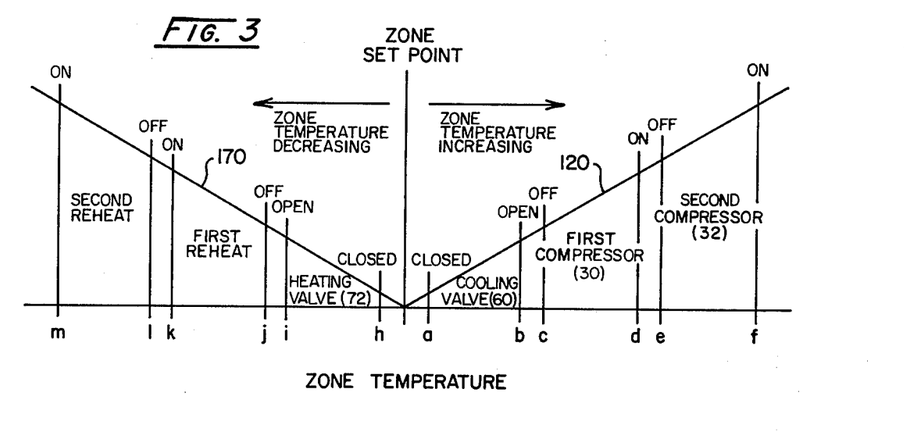
FIG. 3 is a generalized graphical illustration of the temperature-related control sequence of the system of the invention.

FIG. 3 further reveals that the control system of the invention functions to turn on compressor stages 30 and 32 in conjunction with a temperature difference between the set point temperature and the sensed return air temperature which is of greater magnitude than the corresponding temperature differences at which positions these compressors are turned off. This arrangement permits a more efficient operation of the compressor stages. For example, by operating the stages over these temperature differentials or bands, adequate time will be provided for the zone temperature response to be observed at sensor 28 before actuating on and off logic at the compressors, i.e. the slow response rate of the entire system is accommodated for by this form of operation. It should be noted, however, that for computer room installations the return air cycle amounts to about 60 seconds.

Returning to FIG. 1, depending upon the season, the cooling capacities of cooling coil 16, operating in conjunction with outdoor heat exchanger 50, can be quite significant. For example, at approximately a 60° F. heat exchange fluid temperature within conduit 58, liquid cooling coil 16 will assert a cooling capacity generally equivalent to one of the refrigeration compressor stages. Further, as the fluid temperature reaches about 45° F. (corresponding to about a 35° F. ambient or outdoor temperature) liquid cooling coil 16 is capable of assuming a cooling capacity equivalent to the operation of the refrigeration components utilizing both compressor stages 30 and 32. When either or both of the latter stages are in an off condition, a form of "runaround loop" is effected with respect to coil 16 and heat exchanger 50. In this regard, when both compressor stages are off, valves 64 and 74 will assume an orientation wherein the fluid exchange medium passes through conduits 92 and 94 into liquid cooling coil 16 and then is diverted through lines 61 and 62 to respective valves 64 and 74 to return to the input conduit 70 and, thence, to outdoor heat exchanger 50. In the event that the zone load is lessened such that too much cooling would otherwise occur, the control asserted by motor 96 over valve 60 is activated and the valve is gradually turned toward a closed position.

Monitoring of the humidity of the treated zone air is carried out by a humidity sensor and associated control system shown, respectively, at 130 and 132. Sensor 130 is positioned to sample return air at input duct 10 and, upon sensing a lack of adequate moisture within that air, provides a signal acted upon by control 132 which activates humidification stage 24 by an appropriate signal asserted along line 134.

In the event that the moisture content sensed at sensor 130 is above a desired level, then control 132 asserts a corresponding signal to control function 90, as represented schematically by line 136. Control function 90 responds by causing the system to cool return air both by utilizing the cooling available at liquid cooling coil 16, as well as at evaporator coil 18, the latter operating in conjunction with second compressor stage 32 functioning in conjunction with condenser 44. By thus cooling the air passing through the system, the level of air-entrained moisture is reduced, however, the return air temperature ultimately witnessed at sensor 28 generally will be below the desired set-point temperature for the controlled zone. Accordingly, heating function coil 20 as well as auxiliary reheat coils 22A or 22B may become active within the system to regain the temperature set point. Concerning liquid cooling coil 16, the command asserted from control function 90 is one causing motor 96 to actuate valve 60 to permit the diversion of a predetermined amount of circulating heat exchange fluid through conduits 92 and 94. For example, a signal representing about a one-half open valve condition may be asserted, depending upon the initial temperature of the liquid as determined by sensor 102 and over-ride switch 104. The heat exchange fluid then circuits through condenser 44 in heat exchange relationship with refrigerant gases passing therethrough from compressor stage 32. As before, this heat exchange fluid, as controlled from valve 74, passes along input conduit 70 to heating valve 72. If this fluid is of sufficiently high temperature, by command from control function 90 as represented by line 145, heating valve 72 is driven by motor 138 as energized from line 147 to permit the diversion of hot heat exchange fluid along conduits 140 and 142 to reheat coil 20. Note that coil 20 is positioned to confront air as it passes from evaporator coil 18. As a condition precedent to this diversion, however, an over-ride control is asserted, as represented at block 144, which responds both to the temperature of the heat exchange fluid at input conduit 70, as measured by a sensor 146, and to the temperature of air having passed through evaporator coil 18, as measured by a sensor 148. Input to control 144 from sensor 146 is represented by line 150, while the corresponding input from sensor 148 is represented by line 152. Thus, valve 72 is opened in correspondence with the temperature differential of the air returning from the conditioned zone and evaluated at sensor 28 with respect to the predetermined set point temperature. However, in order for this diversion of heat exchange fluid to take place, the temperature of the fluid within input conduit 70 must be sufficiently high so as to be above the temperature of air having passed through evaporator coil 18.

Should the amount of heating made available from conduits 140 and 142 be insufficient to return the zone return air to its set point temperature, then auxiliary heating of the zone being conditioned is carried out. The control function 90 responds to provide this auxiliary heating in a staged fashion depending upon the temperature differential between the set point temperature and that temperature witnessed at sensor 28. In this regard, a signal is asserted from control function 90 to electrical heating coils 22A and 22B as represented by line 160. These coils are activated in a temperature dependent sequence. Conversely, as the zone temperature approaches the predetermined set point temperature, the heating components are sequenced off in a somewhat similar but reverse manner. As is apparent, a broad variety of auxiliary heating arrangements may be provided for this auxiliary heating function. For example, steam may be selectively passed through a properly positioned coil or other source of heat adjacent the region being environmentally controlled.

Thus far, the heating or reheat function has been described in connection with the dehumidification of air within the zone being controlled. Conditions may arise within the controlled zone wherein a minor amount of heat is required to maintain the set point temperature, no cooling function being carried out. The system of the invention also is operative to provide heating under these conditions; for example, control function 90 will signal motor 138, controlling heating valve 72, to circulate heat exchange fluid to reheat coil 20 in the manner above described to achieve appropriate set point temperatures. For this to be carried out, however, the requisite condition that the fluid within conduit 70 be warmer than the air passing inactive evaporator coil 18 as determined at control 144 must be met. Thus, the energy conserving operation of the system continues under such conditions. Where the amount of heat still is insufficient, the control at 90 will respond by activating the auxiliary facilities; for example, that shown at coils 22A and 22B.

Looking again to FIG. 3, the heating logic of the control system is represented schematically, a ramp shaped line 170 shown therein very generally representing a voltage signal level generated for varying differences between lower zone temperatures and the set point temperature for the zone. The operation of the system in a heating mode is similar to that described in conjunction with the cooling mode, heating valve 72 being proportionally opened from its closed position, h, spaced from the set point temperature a small fraction of a degree to define a dead band permitting a slight over-cooling, and extending to a temperature differential indicated at, i, representing a full open position for the valve. Should the zone temperature continue to decrease, as witnessed at sensor 28, a zone temperature differential, k, may be developed whereupon, should the system be operating in a dehumidification mode, the control system will energize coil 22A. Should this heat input remain insufficient to bring the temperature of the air within the treated zone toward the set point temperature, the zone temperature may fall for example, to a level representing the temperature difference, m. At the latter level, the control system activates the auxiliary reheat facility as represented at coil 22B. The system operates the first and second reheat features in a manner wherein the auxiliary reheat coil 22B remains energized even though the temperature difference of the zone being controlled is within the range of level m to level l. Similarly, the coil 22A remain energized as the temperature difference alters from levels k to j. The temperature differential spacing between various heating activities permits the system adequate time to witness the reaction of zone return temperatures to the operation of those heating functions. As in the case of the cooling operation of the system, those components demanding highest energy are the first to be cycled off as the zone return air temperature approaches the predetermined zone set point. This arrangement maximizes the efficiency of the air treatment system in a heating mode in complement with a similar arrangement provided when the system operates in a cooling mode.

Figure 4:
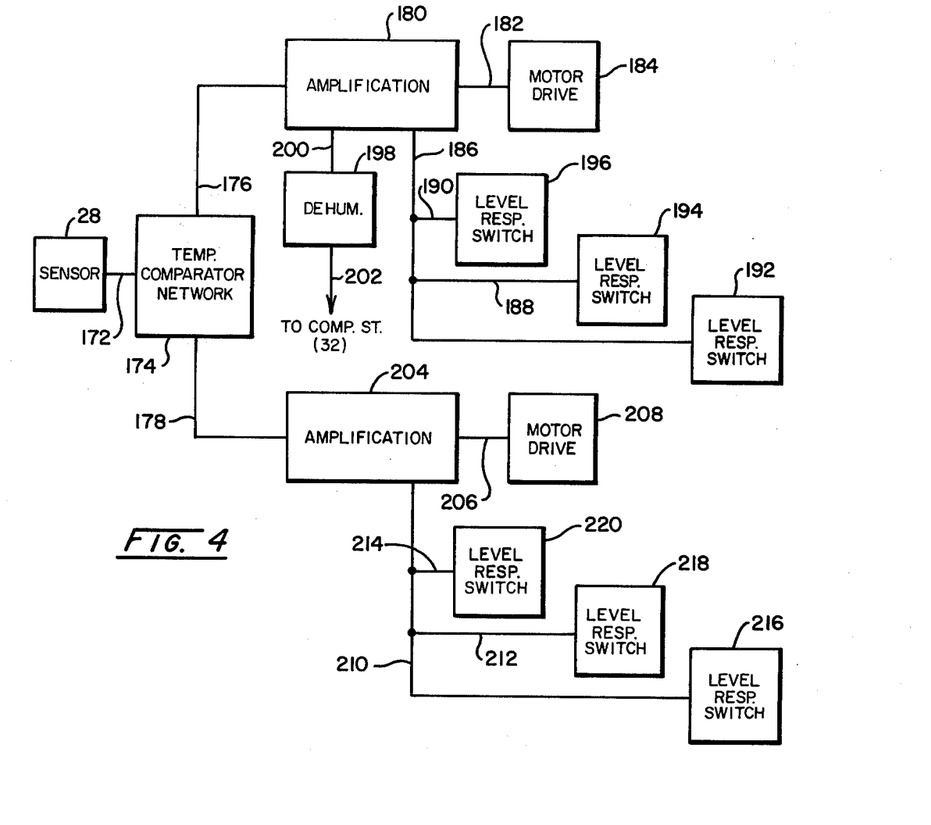
FIG. 4 is a schematic block diagram of a control circuit utilized with the system of the invention.

Referring to FIG. 4, the control system represented at block 90 and at sensor 28 in FIG. 1 is revealed in more detail. The control system is only schematically represented in the figure and is described in enhanced detail in copending application for U.S. patent Ser. No. 779,744 (supra). Sensor 28 is repeated in the figure at 28' and is shown providing a signal along line 172 to a temperature comparator network represented by block 174. Network 174 functions to compare the temperature sensed at 28' with the predetermined or set point temperature and develops a corresponding signal representing the difference or differential between those temperature levels. In the event that additional cooling is called for, a temperature difference signal is asserted along line 176, while, correspondingly, should the addition of heating be called for, a temperature difference signal is asserted along line 178.

Assuming that the sensed temperature differential is one developing a signal at line 176 calling for cooling, the signal is treated at an amplification stage 180 which develops a voltage output at line 182 having a level proportioned with the extent of the noted temperature differential. This signal is asserted through earlier described over-ride function 104 to the motor drive 96 of valve 60 as represented by block 184. The same signal is asserted through lines 186, 188 and 190 to the inputs of level responsive switching networks represented, respectively, by blocks 192, 194 and 196. By adjustment of the signal asserted from amplification stage 180, these switching functions operate to activate the compressor stages 30 and 32 in the earlier described staged sequence. For example, network 196 activates the first compressor stage 30 upon the signal at line 190 reaching a predetermined level, while network 194 serves to activate second compressor stage 32 as the signal at line 188 increases to a still greater level. Multiple stages are available for operation with the system, one additional stage being represented at block 192.

In the event that dehumidification control function 134 calls for dehumidification, a signal is generated as represented at block 198 which is asserted through line 200 to the amplification function 180. This signal is treated and asserted along line 182 to motor drive function 184 to cause the system to actuate motor 96 and open valve 60 to a predetermined extent permitting a cooling operation at liquid cooling coil 16. As before, this signal may be inhibited by control 104. Dehumidification function 198 additionally asserts a signal along line 202 to compressor stage 32 to cause that stage to commence mechanical refrigeration of the air passing through evaporator coil 18. At such time as the humidity level of the return air, as sensed at 130, is proper, the signals asserted from function block 198 along lines 200 and 202 are removed.

In the event that network 174 develops a signal at line 178 calling for the heating of return air, such signal is treated in similar manner as for the signals developed at line 176, amplification being carried out as represented at block 204 to provide a signal at line 206. The signal at line 206 serves to energize motor drive 138 associated with heating valve 72 as represented by block 208. The temperature differential signal also is presented along lines 210, 212 and 214 which are coupled with level responsive switching networks shown respectively at 216, 218 and 220. These networks are arranged such that auxiliary reheat function or coil 22A is activated by network 220 when the signal at line 214 is of a first predetermined level, while reheat coil 22B is activated when a signal level representing a larger temperature differential is developed at line 212 and asserted at network 218. As before, greater numbers of switching stages may be provided with the system of the invention as represented by block 216.

Figure 2A:
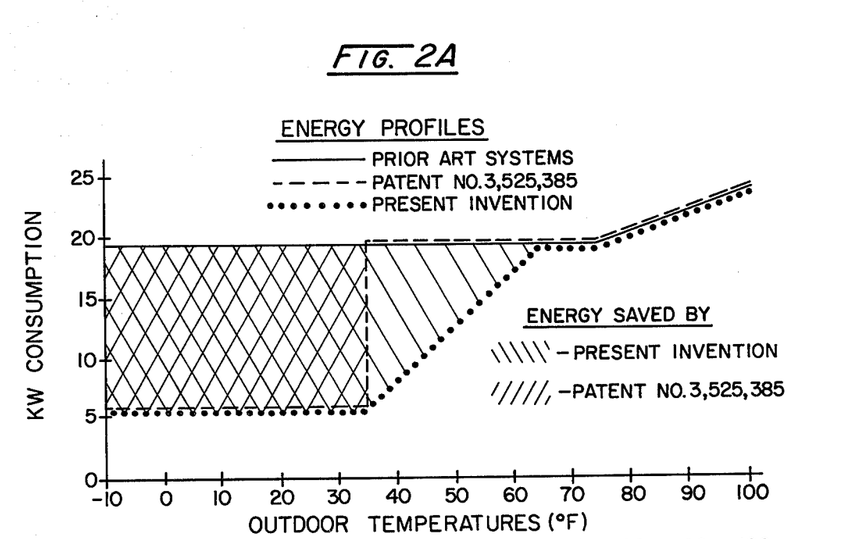
FIG. 2A is a graphical illustration comparing power consumption characteristics with respect to outdoor temperatures for systems of the prior art as well as the system of the instant invention.
Figure 2B:
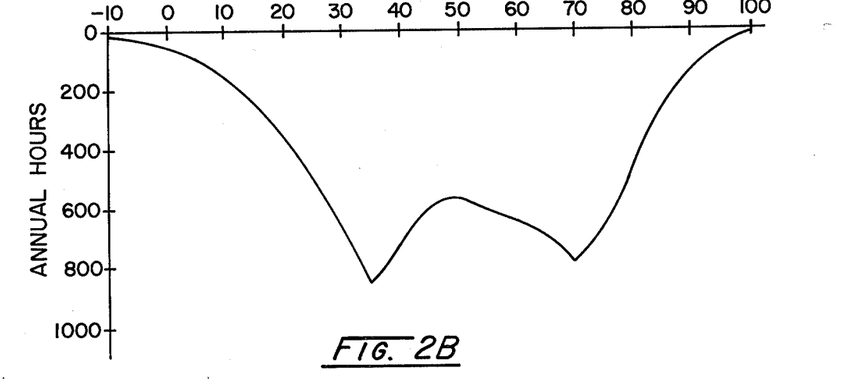
FIG. 2B is a graph showing the average number of annual hours at which a series of temperatures occur as developed for the city of Detroit, Mich., the figure being aligned so as to be readable in conjunction with FIG. 2A.

Looking to FIG. 2A, curves depicting the power consumption of the present invention, that power consumption represented by the system described in the above discussed U.S. Pat. No. 3,525,385 and that of purely mechanical prior art systems are displayed with respect to a range of outdoor temperatures. The kilowatt levels shown are those typically encountered in the operation of nominal 15 ton equipment operating continuously. The curves reveal that when the outdoor or ambient temperatures are 35° F. or less, freecooling is provided wherein relatively low energy demands are made by systems following the teachings of the noted patent or under the instant system. Correspondingly, conventional mechanical equipment, operating continuously, will exhibit higher energy demands at these temperature levels. At temperatures ranging from about 35° F. to 65° F., these higher power consumption levels are witnessed both by the prior art systems as well as by the system represented by the noted patent. However, with the instant system a partial freecooling is developed, the above-described precooling of return air providing for lessening of energy consumption. This intermediate temperature level region of operation of the instant system becomes particularly significant when considered in conjunction with the average temperature ranges encountered in a typical northern industrial city; for example, Detroit, Mich. FIG. 2B, when read in conjunction with FIG. 2A, shows that the average number of annual hours at temperatures between 35° F. and 65° F. becomes quite significant for a given year of operation. As a consequence, the amount of energy saved using the precooling arrangement of the invention represents a significant lessening of total power consumption.

Figure 5:
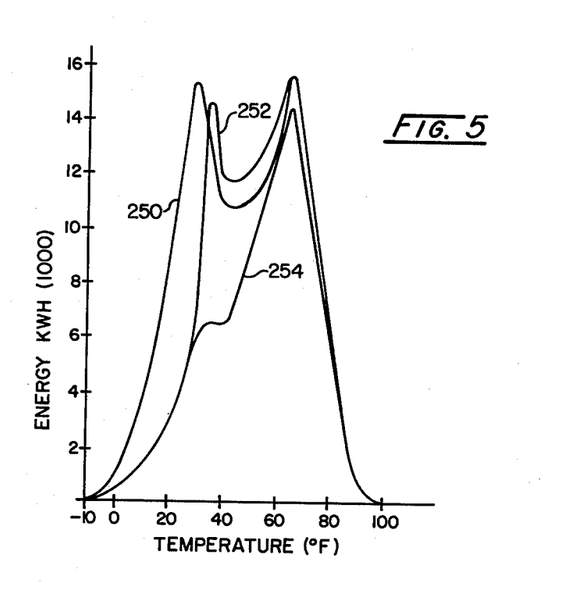
FIG. 5 shows three curves representing three air conditioning systems including that of the invention relating ambient temperatures and the annual hours of FIG. 2B with corresponding system power consumption.

Referring to FIG. 5, the data represented in FIGS. 2A and 2B can be combined to show power consumption in terms of kilowatt hours for the noted range of outdoor temperatures. In the figure, curve 250 may be interpreted (integrated) to show the power consumption of a conventional mechanical refrigeration system operating continuously and with respect to the noted weather data developed for Detroit, Mich. Curve 252 similarly shows the correspondingly less power consumption for the system represented by U.S. Pat. No. 3,525,385. The significant improvement in power consumption of the system of the instant invention is revealed at curve 254, particularly as that curve is developed for temperatures between 35° F. and 65° F.

Figure 6:
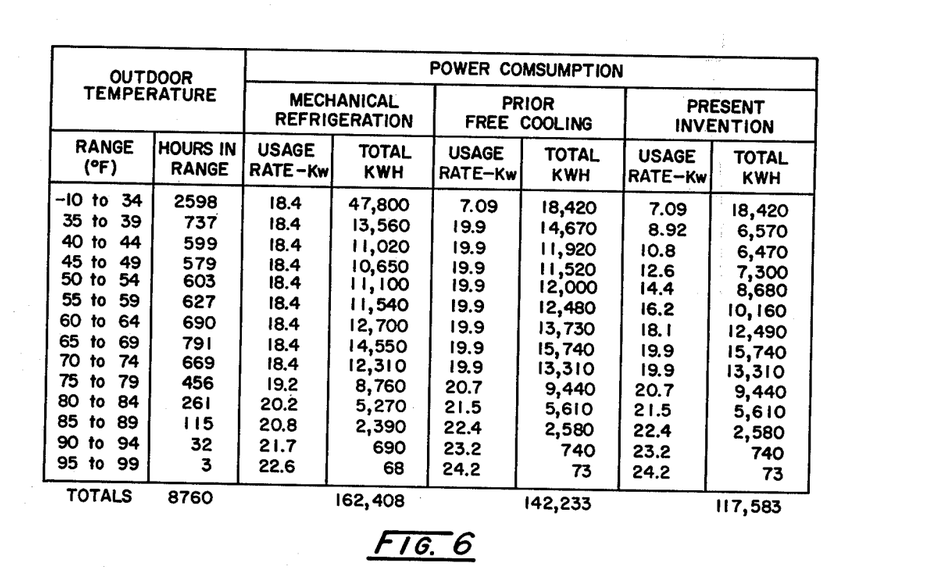
FIG. 6 is a tabulation comparing computed exemplary energy usages of prior air conditioning systems with the air conditioning system of the instant invention.

Looking to FIG. 6, a tabulation comparing the data represented by curves 250 and 252 with that representing the instant invention at curve 254 is provided. The table readily reveals a significant lessening of power consumption occasioned with the operation of the instant system both as compared with fully mechanical air refrigeration systems and the improved system represented by the noted U.S. Patent.

As is apparent, the extent of economies and power consumption which may be realized with the system of the instant invention will depend upon the temperature patterns of the locale within which the system is installed. However, as indicated earlier, a significant geographical territory is available for the use of the invention, such territory including major industrial regions.

Since certain changes may be made in the above described system and apparatus without departing from the scope of the invention herein involved, it is intended that all matter contained in the description thereof or shown in the accompanying drawings shall be interpreted as illustrative and not in a limiting sense.

I claim:

1. In an air conditioning system of a variety treating air within zone to achieve a predetermined temperature therewithin, said system having refrigeration components including operatively associated compressor means, condenser means and an evaporator coil, means for circulating return air from an input through said evaporator coil, a heat exchanger situated within an ambient environment remote from said zone and a liquid transfer circuit including input and output conduits for circulating a heat exchange fluid between said heat exchanger means and said condenser means, the improvement comprising:

liquid cooling coil means coupled in liquid exchange relationship within said liquid transfer circuit and situated to confront and cool said return air prior to the passage thereof through said evaporator coil;

cooling valve means coupled with said output conduit and actuable to effect a select passage of said heat exchange fluid through said liquid cooling coil means;

sensor means having an output corresponding with the temperature of said heat exchange fluid within said output conduit; and control means responsive to the temperature of said return air and to said sensor means output for actuating said cooling valve means when the temperature of said heat exchange fluid within said output conduit is lower than the temperature of said return air, said cooling valve means being actuated to an extent wherein said liquid cooling coil means capability for cooling said confronted air is utilized when said return air temperature is above said predetermined temperature and said operatively associated compressor means, condenser means and evaporator coil means are operated to cool said air when said liquid cooling coil means' capability is inadequate to cause said return air to attain said predetermined temperature.

2. The improved air conditioning system of claim 1 wherein said control means is responsive to said heat exchange fluid temperature to commence to effect the said actuation of said cooling valve means when the temperature of said ambient environment is about 65° Fahrenheit.

3. The improved air conditioning system of claim 1 in which said cooling valve means is actuable to be selectively positioned in orientations between fully open and closed positions to effect said select passage of said heat exchange fluid to said liquid cooling coil means; and said control means is configured for actuating said cooling valve means in predetermined correspondence with the said difference between said predetermined temperature and said return air temperature.

4. The improved air conditioning system of claim 1 in which said control means is configured for actuating said cooling valve means to effect passage of said heat exchange fluid through said liquid cooling coil means when said heat exchange fluid within said output conduit has a temperature of about 1° F. less than said predetermined temperature.

5. The improved air conditioning system of claim 1 in which said control means is configured for actuating said cooling valve means to effect passage of said heat exchange fluid through said liquid cooling coil means when said heat exchange fluid within said output conduit has a temperature of about 10° F. less than said predetermined temperature.

6. The improved air conditioning system of claim 1 in which said control means is configured to effect operation of said system in a sequence wherein said operatively associated compressor means, condenser means and evaporator coil are deactivated when said return air temperature reaches a level above said predetermined temperature wherein said capability of said liquid cooling coil means is adequate to alter said return air temperature to substantial equality with said predetermined temperature.

7. The improved air conditioning system of claim 1 wherein:

said air conditioning system is of a variety further including humidity sensor means for generating a signal representing a humidity level of said return air above a predetermined level; and said control means is operative in the continued presence of said signal to actuate said cooling valve means to a predetermined extent to effect a corresponding passage of said heat exchange fluid through said liquid cooling coil means, and to simultaneously activate said operatively associated compressor means, condenser means and evaporator coil means.

8. The improved air conditioning system of claims 1 or 7 further comprising:

first heating coil means situated to confront and heat air directed thereto from said evaporator coil means;

heating valve means coupled intermediate said input conduit and said first heating coil means and actuable to be selectively positioned in orientations between fully open and closed positions to effect a select passage of said heat exchange fluid through said first heating coil means;

second heating means situated to confront air having been treated by said first heating coil means; and said control means being responsive to said return air temperature for actuating said first heating valve means when said return air temperature is lower than said predetermined temperature and for actuating said second heating means when the heating capacity of said first heating coil means is inadequate to alter said return air temperature to substantial equality with said predetermined temperature.

9. The improved air conditioning system of claim 8 in which said control means is configured to effect operation of said system in a sequence wherein said second heating means is deactivated when said return air temperature reaches a level below said predetermined temperature wherein said capability of said first heating coil means is adequate to alter said return air temperature to substantial equality with said predetermined temperature.

10. The improved air conditioning system of claim 8 in which said control means is configured for actuating said heating valve means in predetermined correspondence with the said difference between said return air temperature and said predetermined temperature until said fully open position is derived.

11. The improved air conditioning system of claim 9 in which said control means is configured for actuating said heating valve means in predetermined correspondence with the said difference between said return air temperature and said predetermined temperature until said fully open position is derived.

* * * * *

UNITED STATES PATENT AND TRADEMARK OFFICE
CERTIFICATE OF CORRECTION

PATENT NO. : 4,271,678

DATED : June 9, 1981

INVENTOR(S) : Ralph C. Liebert

It is certified that error appears in the above—identified patent and that said Letters Patent is hereby corrected as shown below:

Please delete the title (both occurrences) and substitute the following therefor:

--REFRIGERATIVE AIR CONDITIONING SYSTEM WITH SUPPLEMENTARY AMBIENT DERIVED COOLING CAPABILITY--.

Signed and Sealed this

Fifteenth Day of September 1981

[SEAL]

Attest:

GERALD J. MOSSINGHOFF

Attesting Officer

Commissioner of Patents and Trademarks